(12) United States Patent
Finneran et al.

(10) Patent No.: US 8,560,522 B1
(45) Date of Patent: Oct. 15, 2013

(54) ADDITIONAL QUERY DATE TERM GRANULARITY

(75) Inventors: Paul Finneran, Galway (IE); Oliver Weiser, Galway (IE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/434,098

(22) Filed: Mar. 29, 2012

(51) Int. Cl.
*G06F 17/30* (2006.01)

(52) U.S. Cl.
USPC ............ 707/713; 707/805; 715/227; 715/762

(58) Field of Classification Search
USPC .................. 707/718, 779, 765, 766, E17.044, 707/E17.078, E17.108, 999.003, 999.004, 707/999.101, 999.102; 715/762, 227
See application file for complete search history.

(56) References Cited

U.S. PATENT DOCUMENTS

| | | | |
|---|---|---|---|
| 5,608,899 A | 3/1997 | Li et al. | |
| 6,353,830 B1 | 3/2002 | Yee et al. | |
| 7,756,907 B2 * | 7/2010 | Stolte et al. | 707/805 |
| 7,979,424 B2 | 7/2011 | Dettinger et al. | |
| 7,991,672 B2 * | 8/2011 | Crowder | 705/36 R |
| 2003/0187716 A1 * | 10/2003 | Lee | 705/10 |
| 2008/0177719 A1 | 7/2008 | Dettinger et al. | |
| 2008/0195608 A1 * | 8/2008 | Clover | 707/5 |
| 2008/0195930 A1 | 8/2008 | Tolle | |
| 2008/0208820 A1 * | 8/2008 | Usey et al. | 707/3 |
| 2008/0270363 A1 * | 10/2008 | Hunt et al. | 707/3 |
| 2008/0319942 A1 | 12/2008 | Courdy et al. | |
| 2009/0018996 A1 * | 1/2009 | Hunt et al. | 707/2 |
| 2009/0031236 A1 * | 1/2009 | Robertson et al. | 715/765 |
| 2009/0119074 A1 * | 5/2009 | Massaro et al. | 703/1 |
| 2009/0193047 A1 | 7/2009 | Chen et al. | |
| 2009/0300544 A1 * | 12/2009 | Psenka et al. | 715/810 |
| 2010/0281039 A1 * | 11/2010 | Dayon | 707/754 |
| 2010/0287146 A1 * | 11/2010 | Skelton et al. | 707/705 |
| 2010/0318545 A1 * | 12/2010 | Handy et al. | 707/759 |
| 2011/0093568 A1 * | 4/2011 | Thomas | 709/219 |
| 2011/0307504 A1 | 12/2011 | Agrawal et al. | |
| 2012/0054216 A1 | 3/2012 | Haahr et al. | |

OTHER PUBLICATIONS

Philo Janus, Guy Fouché—"Creating Dimensions"—Pro SQL Server 2008 Analysis Services Topics "Data Structures, Cryptology and Information Theory" 2009 (pp. 117-166).*
John H. Nguyen, Yuval Shahar, Samson W. Tu, Amar K. Das, and Mark A. Musen—"Integration of Temporal Reasoning and Temporal-Data Maintenance into a Reusable Database Mediator to Answer Abstract, Time-Oriented Queries: The Tzolkin System"—Journal of Intelligent Information Systems, Jul. 1999, vol. 13, Issue 1-2, (pp. 121-145).*
Nigel R. Shadbolt et al., NITELIGHT: A Graphical Tool For Semantic Query Construction (2008).

* cited by examiner

*Primary Examiner* — John E Breene
*Assistant Examiner* — Anh Ly
(74) *Attorney, Agent, or Firm* — Kenyon & Kenyon LLP

(57) ABSTRACT

Additional date term granularity may be added to query results and query interfaces used to append query results. Initially, a partial execution of a query may be triggered to identify fields and field types. Fields may be classified as date fields based on their field type. The query may be appended to compute one or more time periods for each classified date field. Each time period may identify a broader time period than the data included in a corresponding classified date field. A query result, which may include the computed time period(s) and time period field(s), may be generated from the execution of the appended query.

26 Claims, 6 Drawing Sheets

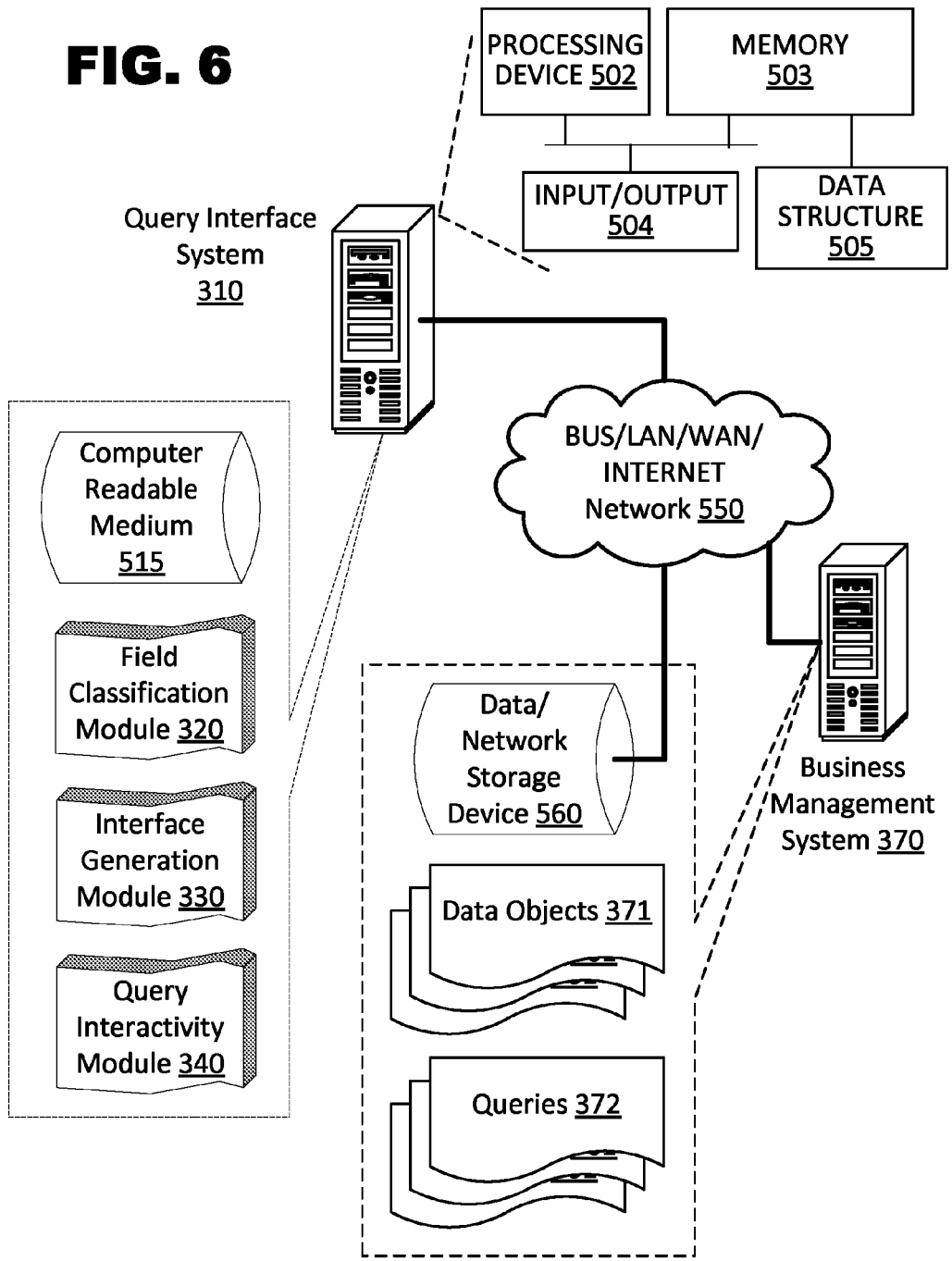

ADDITIONAL QUERY DATE TERM GRANULARITY

BACKGROUND

Many organizations use business management software to manage core business functions including, for example, financials, sales, customer relationship management, inventory, and operations. Users of the business management software often run reports or otherwise extract data from the software application for different business purposes such as setting targets, measuring performance, and forecasting future events. These reports and data extractions are generated based on data included in a business management system.

These queries, however, may be static queries that are configured and then executed. The data satisfying the query criteria is then typically represented in a grid or static chart. If the user wants to change an aspect of the query or the data included in the query, the user must return to the query designer to change the query, after which time the query is re-run, and the grid or static chart is recreated. This process is cumbersome and inefficient as the user must switch to and from the query designer to change the query and have the query re-executed.

There is a need for additional functionality in business management systems that enables users to restructure query results and change the output format of query results in real time without having to switch program components to change the original query.

BRIEF DESCRIPTION OF THE DRAWINGS

FIG. 6 shows an exemplary architecture.

DETAILED DESCRIPTION

Figure 1:
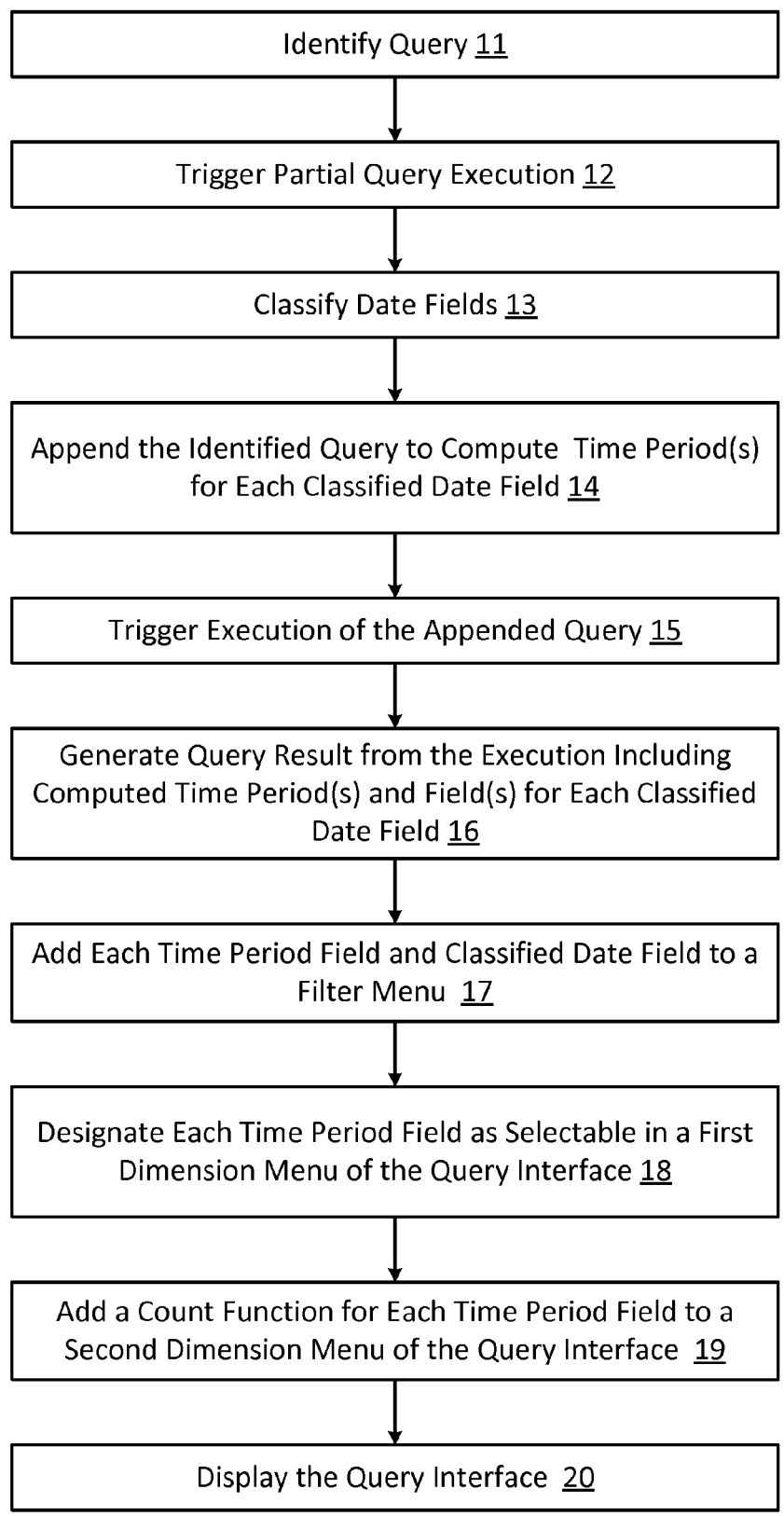
FIG. 1 shows a first exemplary process.

One or more modules may provide an interface and tools for adding additional date term granularity to query results and query interfaces. The modules may be included as a stand-alone component that may be added onto an existing business management system to provide this added functionality. The modules may also include tools enabling the module to read queries from the business management system and then append additional terms to the read query without actually changing the query in the business management system. The queries that included the appended terms may then be executed and the results may be outputted.

For example, the modules may be capable of classifying date fields in a query result based on their field type, computing new a time period of a date in each date field, and appending a query in the business management system to include the additional time period field in the query result. The modules may also be capable of triggering an execution of the appended query, reading an output or result of the query execution, and performing additional functions, such as filtering the result from the modified query.

The modules may also include an interface, such as a graphical user interface, providing several options for a user to select different criteria and options for additional terms appended to the original query without requiring the user to re-program or re-write the query in a particular query programming language. Thus, for example, a user may be able to generate an appended query in an Structured Query Language (SQL) by selecting different criteria and options without having to know the semantics and syntax of SQL.

The interface may also include an output display area for displaying a result or output of an executed query. In some instances, the output display area may include the ability to display the raw query results in a table format in which one or more fields of the query results may be displayed in the interface. The output display area may also display a chart, graph, or other visual representation of the query results.

The interface may also include different menus having different options for selecting the data that is to be displayed in the output display area. These menus may include a filter menu, a first dimension menu, and a second dimension menu. The filter menu may include a list of fields that may be restricted to a particular value or range of values. Selecting one or more of these fields may provide the user with an opportunity to select the value or range of values to which the results of the query displayed in the output display area are to be restricted.

The first dimension menu may include a list of fields that may be shown on a first dimension of a chart, graph, grid, or other visual representation of the query results in the output display area. The second dimension menu may include a list of functions applied to the query results that may be shown on a second dimension of the chart, graph, grid, or other visual representation of the query results in the output display area. In some instances, the first and second dimensions may be either horizontal or vertical dimensions. For example, if the first dimension corresponds to a horizontal axis of a graph, then the second dimension may correspond to a vertical axis, and vice versa.

FIG. 1 shows a first exemplary process. The process may be executed by a processing device. The process described in FIG. 1 may be included and/or integrated into the process described in FIG. 3. A set of instructions for executing the process may be stored in a computer readable medium. In box 11, a query in the business management system may be identified. The query may be identified using a query identifier, report identifier, or other identifier. The query may also be selected from a list or other source.

In box 12, a partial execution of the identified query may be triggered. The partial execution of the identified query may generate a partial query output of the fields and/or field types included in a result set without actually outputting any data. For example, the identified query may be executed to only generate a list of fields and fields types included in the query output. At this point, the partial execution of the identified query may cease. The generated list of field types may be used to classify each of the fields.

In box 13, those field type that are recognized date types may be classified as date fields. Any recognized date format or date type may be used.

In box 14, the identified query may be appended, using a processing device, to compute a year, quarter, month, and week, of the data in each classified date field. The identified query may also be appended to create new respective fields in a query result for storing the computed year, quarter, month, and week data associated with each classified date fields.

In other embodiments, other time periods may be computed instead. For example, in some instances only a year may be computed, while in other instances a semester or trimester may be computed. In other instances, the time periods that are computed may vary for different classified date fields. Thus, in other embodiments the identified query may be modified to compute one or more time periods for each classified date field. Each computed time period may encompass a broader time period than specified in the classified date field.

In box 15, an execution of the appended query may be triggered to cause the processing device to execute the appended query.

In box 16, a query result may be generated from the execution of the appended query. The query result may include the computed time period and the time period field, such as, in one example, the computed year, quarter, month, and week field data and fields associated with each classified date field.

In box 17, each of the classified date fields and the time period fields may be added to the filter menu. Thus, in one example, the year, quarter, month, and week fields may be added to the filter menu in the query interface, though in other instances the added time period fields may vary.

A user may be able to select one or more of the fields included in the filter menu to filter the modified query results. In addition to selecting one or more of the fields in the filter menu, the user may also be able to select a range of one or more dates in the respective selected fields for filtering. In the year field, the date range may include one or more years. In the quarter field, the date range may include one or more quarters. In the month field, the date range may include one or more months. In the week field, the date range may include one or more weeks. The selectable date ranges available to the user may be limited in some instances to those dates included in a respective date field of the modified query result.

In some instances, a range of values associated with each of the fields added to the filter menu may be identified. An option may then be provided in the filter menu to select at least one value in the range of values associated with at least one field added to the filter menu. The modified query result may then be filtered based on a selection of the at least one value in the range of values associated with at least one field added to the filter menu.

In some instances, the user selectable date ranges may be bound by an earliest date and a latest date included in the modified query result. For example, if data in a year field includes various years between 1990 and 2000, then the date range available to the user in the filter menu for the year field may be limited to those years between 1990 and 2000.

In some instances, a user may select date ranges from each of the year, quarter, month, and week fields and the modified query result may be filtered include only those results having each of the year, quarter, month, and week field data within each respective user selected date range.

In box 18, each of the time period fields may be designated as selectable in a first dimension menu of the query interface. As discussed previously, these time period fields may include, but are not limited to, the year, quarter, month, and week fields, which may be designated as selected in an embodiment.

In box 19, a selectable count function may be added for each time period fields in a second dimension menu of the query interface. As discussed previously, in one embodiment, these time period fields may include, but are not limited to, the year, quarter, month, and week fields. The count function may count a number of instances of a unique field value.

In box 20, the query interface may be displayed to user. The user may then select one or more of the fields added to the filter, first dimension, and second dimension menus to generate a custom query result. In some instances, a graph, chart, grid or other visual representation may be generated from the query result.

For example, in an embodiment, a selection of at least one field in the first dimension menu and at least one function in the second dimension menu may be received. The identified query may be appended, using the processing device, to apply the at least one selected function added in the second dimension menu according to the at least one selected field in the first dimension menu. Data from the at least one selected field from the first dimension menu may be displayed in a first dimension of the interface and a result of applying the selected function in the appended query to data displayed in the first dimension may be displayed in a second dimension of the interface.

Figure 2:
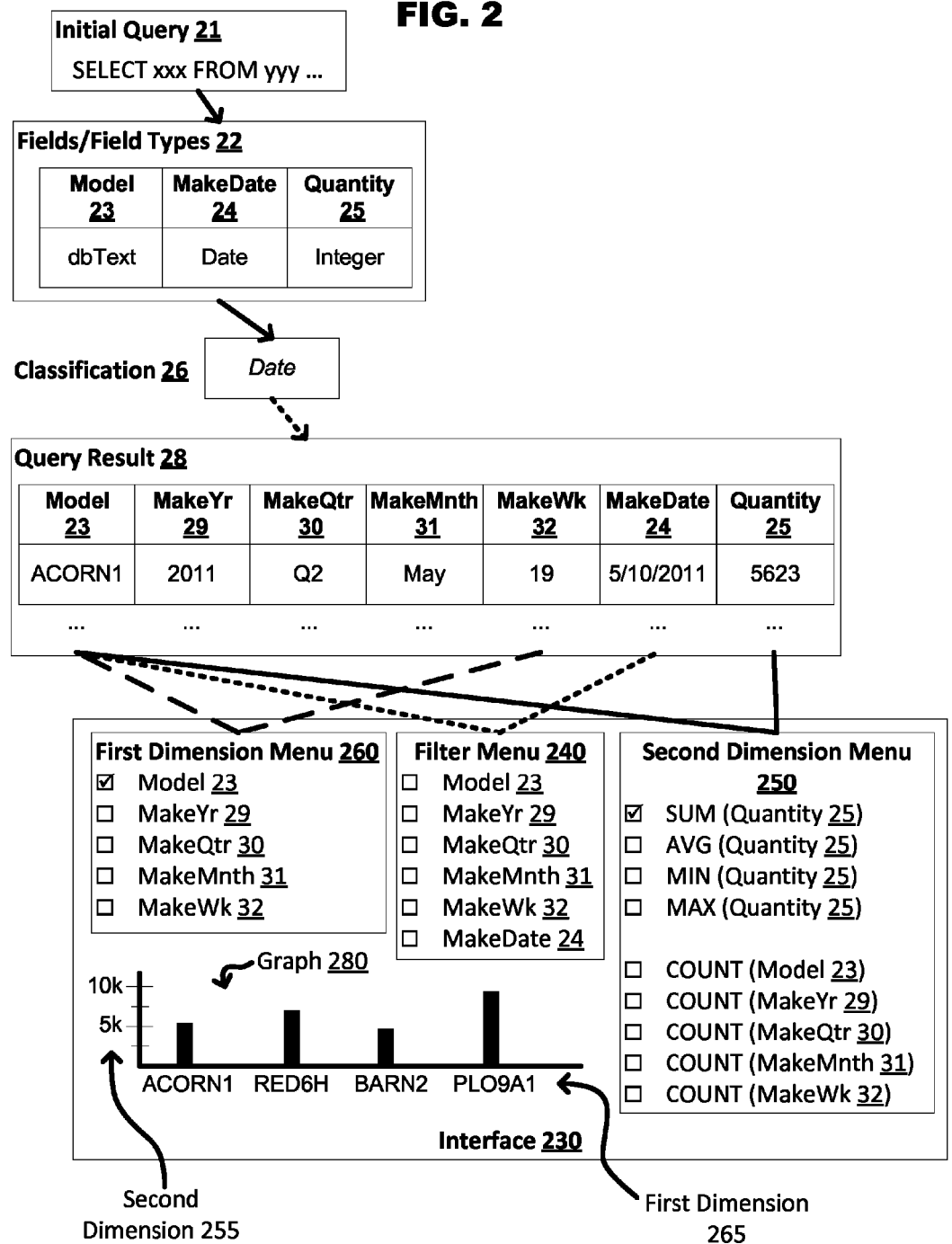
FIG. 2 shows an exemplary execution of the first process.

FIG. 2 shows an exemplary execution of the first process. In box 21, an initial query may be selected. In this case, the query to be selected is a query in a structured query language (SQL), though in different embodiments different queries types, languages, and structures may also be selected. Once the initial query has been identified, at least a partial execution of the identified query may be triggered to identify the fields and fields types in a query result.

Exemplary fields and field types are shown in box 22. In this example, the fields Model 23, Manufacturing or MakeDate 24, and Quantity 25 are included in the field/field type list 22.

Once the partial result has been generated, the field types 22 may be analyzed to identify those fields that should be classified as a date field according to its field type.

In the example shown in FIG. 2, only the MakeDate field 24 contains a recognized date field type, so only the MakeDate field 24 may be classified as a date field. Once the classification process 26 is complete, the query may be appended to compute one or more additional time fields (in this example, a year, a calendar quarter, a month, and a week of each date in the MakeDate field 24). Additionally the query may also be appended to create new time period fields including a MakeYr field 29, MakeQtr field 30, MakeMnth field 31, and MakeWk field 32 to store the respective computed year, calendar quarter, month, and week of each date in the MakeDate field 24. A first row of an exemplary query result 28 is shown.

The created year, quarter, month, and week fields 29 to 32 may be associated with their respective classified date field 24 in the query result 28. In the example shown in FIG. 2, the created year, quarter, month, and week fields 29 to 32 are associated with the classified date field, MakeDate 24, by including at least part of the field name of the classified date field 24 in each of the field names 29 to 32. In other instances, the association between the created field and the original classified date field may be through a link or other association between the fields.

Each of the date fields 24 and 29 to 32 in the query result 28 may then be added to a filter menu 240 in a query interface 230. Each of the newly computed time period fields 29 to 32 may also be added to a first dimension menu 260 in the interface 230. A count function may also be added or designated as selectable in a second dimension menu 250 of the interface 230 for each of the newly computed time period fields 29 to 32.

A field selection in the first dimension menu 260 may specify the data displayed in a first dimension 265 of a graph 280 or other visual output of the query result. A selection of one or more functions in the second dimension menu 250 may specify the data to be displayed in a second dimension 255 of the graph 280.

In some instances, a sorting menu may also be displayed in the interface. The sorting menu may include an ascending sorting option, a descending sorting option, and an option to select at least one of the fields added to the filter menu that is to be sorted according to either the ascending sorting option or the descending sorting option. A user may then select either one of the ascending or descending sorting options as well as at least one of the fields added to the filter menu that is to be sorted according to the selected ascending or descending sorting option.

Once the user's selection of the at least one field included in the filter menu that is to be sorted and the user's selection of either the ascending sorting option or the descending sorting option is received, the filtered modified query result may be sorted according to the received selection before outputting the filtered modified query result.

In some instances, a grouping menu may also be displayed in the interface. The grouping menu may include an option to select at least one of the fields added to the filter menu for grouping the filtered modified query result. Once the user selects at least one of these fields for grouping and the selection is received, the filtered modified query result may be grouped according to the received user selection of the at least one grouping field before outputting the filtered modified query result.

In some instances, a limiting menu may be displayed in the interface. The limiting menu may limit a number of results in the filtered modified query results to a top number N of results. The top number N may be selectable by a user. For example, if a user selects the top number N to be 10, then only the top ten query results may be shown in the output display area of the interface.

In some instances, a format menu may be displayed in the interface. The format menu may provide the user with an option to select at least one data format for the output of the filtered modified query result.

Once the user selects one of the data formats and the selection of the one data format is received, the outputted filtered modified query result may be reformatted into a graph, chart, grid or other visual representation in the selected data format. The type of visual representation may also be selectable by a user. For example, a user may be presented with an option to select from a bar chart format, a line chart format, a scatter plot format, a pie chart format, a three dimensional chart format, and a stacked chart format or grid for the visual representation.

The selectable data formats may include a .NET format and a HTML5 format. In some instances, the visual representation may be exported in the selected data format for use by another program.

Figure 3:
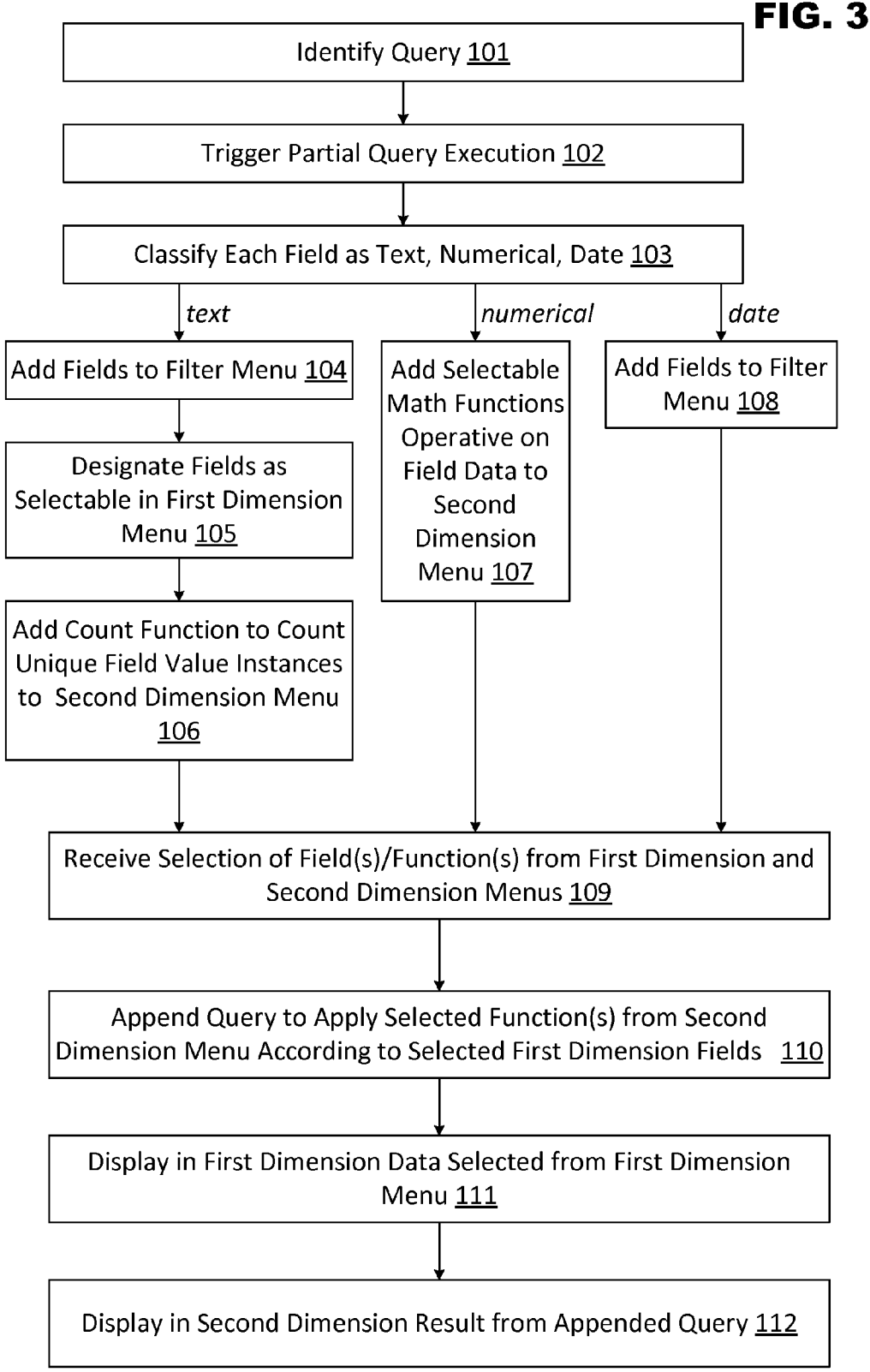
FIG. 3 shows a second exemplary process.

FIG. 3 shows a second exemplary process. The process may be executed by a processing device. A set of instructions for executing the process may be stored in a computer readable medium. In box 101, a query in the business management system may be identified. The query may be identified using a query, report, or other identifier. The query may also be selected from a list or other source.

In box 102, a partial execution of the identified query may be triggered. The partial execution of the identified query may generate a partial query output of the fields and/or field types included in a result set without actually outputting any data. For example, the identified query may be executed to only generate a list of fields and fields types included in the query output. At this point, the execution of the identified query may cease. The generated list of field types may be used to classify each of the fields. In box 103, each field type may be classified, using a processing device, as one of a text, a numerical, and a date type (or any other data type) based on the type definition provided during the partial execution of the identified query. In instances where the field type includes a number type, including, but not limited to, an integer type, real number type, fixed-point type, or floating-point type, the fields may be classified as numerical.

In instances where the field type includes a date type, those fields that consist of data in a valid date format may be classified as date. Any recognized date format may be used.

In instance where the field type does not consist of either a numerical or date type, the field may be classified as text. Boxes 104, 105, and 106 may apply to those fields classified as text fields. In box 104, each respective field classified as text may be added to a filter menu in the interface. In box 105, each respective field classified as text may also be designated as selectable in a first dimension menu of the interface.

Finally, in box 106, a selectable count function may be added to a second dimension menu for each respective field classified as text. The selectable count function may, if selected, count a number of instances that one or more unique field values occur in a respective field.

Box 107 may apply to those fields classified as numerical fields. In box 107, one or more selectable mathematical functions may be added to the second dimension menu of the interface for each field classified as numerical. Each mathematical function may, if selected, perform an arithmetic, logical, statistical, or other computation on data in each respective field. The mathematical functions may include one or more of a sum function, an average function, a minimum function, and a maximum function for each field designated as numerical. Each of these functions may be independently selectable. The sum function may aggregate the data in its field. The average function may average the data in its field. The minimum function may return a lowest data value in its field. The maximum function may return a high data value in its field.

Box 108 may apply to those field classified as date fields. In box 108, each field classified as date may be added to the filter menu.

Once each field has been classified as one of text, numerical, and date in box 103 and then processed in boxes 104 to 108, each of the menus, including the first dimension menu, the second menu, and the filter menu, may be presented to a user through the interface. The user may then select one or more functions or fields from one or more of the menus.

In some instances, a range of possible data values associated with each field added to the filter menu may be identified. The range of possible data values may be obtained by looking up actual data values in each respective field. The range of possible data values may also be obtained by identifying a restriction of data values associated with respective field. For example, if the respective field is designated as a Yes/No or On/Off field, then the data values may be limited to one of these two possible values. On the other hand, if the actual data values of a field only include fifteen unique values, then the range of possible data values may only include these fifteen possible choices.

Once the range of values has been identified, an option may be provided in the filter menu to enable the user to select at least one value in the identified range of values associated with at least one field added to the filter menu. Once the user makes a selection of one or more valued in the identified range and this selection is received, the selected values may be designated as the subset of data from the at least one selected field in the filter menu.

In box 109, a selection of function(s) and/or field(s) made by the user from the first dimension, second dimension, and/or filter menus may be received. This selection may include a selection of at least one of the selectable sum, average, minimum, maximum, and count functions.

In box 110, one or more additional query terms may be appended to the identified query to apply the selected function(s) to the identified query. For example, a received selection of at least one of the functions from the second dimension menu may be applied to the subset of data from the at least one selected field in the filter menu and/or according to the selected field(s) from the first dimension menu.

In box 111, data from one or more fields selected from the first dimension menu may be displayed in a first dimension of the interface. This first dimension may occur along a vertical or horizontal axis of a chart, graph, grid, or other visual representation of the query results in the output display area.

In box 112, a query result from executing the appended query in box 110 may be displayed in a second dimension of the interface. This query result may include an output from applying the selected function(s) to data displayed in the first dimension. The second dimension may also occur along a vertical or horizontal axis of a chart, graph, grid, or other visual representation of the query results in the output display area.

The visual representation of the query results may include displaying data in the first and second dimensions in a graphical format. The graphical format may be switchable between a grid format and any other defined chart format, which may include a bar chart format, a line chart format, a scatter plot format, a pie chart format, a three dimensional chart format, and/or a stacked chart format. If the first dimension is along a vertical axis, then the second dimension may be along the horizontal axis, and vice versa. In some instances, the first dimension may be parallel to a horizontal axis of a graph displayed in the output display area and the second dimension may be parallel to a vertical axis of the graph. In other instances the first and/or second dimensions may be along a radial or axial direction. In other situations, including, but not limited to three dimensional situations, the first or second dimensions may include a direction going into or out of a two-dimensional page. Other directions may also be used in different embodiments.

In some instances, a sorting menu may also be displayed in the interface. The sorting menu may include an ascending sorting option, a descending sorting option, and an option to select at least one field in the first dimension menu that is to be sorted according to either the ascending sorting option or the descending sorting option. A user may then select either one of the ascending or descending sorting options as well as at least a field in the first dimension menu that is to be sorted according to the selected ascending or descending sorting option.

Once the user's selection of the at least one field included in the first dimension menu that is to be sorted and the user's selection of either the ascending sorting option or the descending sorting option is received, an instruction may be appended to the query to sort a query result according to the received selection of the at least one field and the received selection of either the ascending sorting option or the descending sorting option. The appended instruction may then be executed when the query is executed. This may cause the query result to be sorted according to selected sorting options appended to the query.

In some instances, a limiting menu may be displayed in the interface. The limiting menu may limit a number of query results to a top number N of results. The top number N may be selectable by a user. For example, if a user selects the top number N to be 10, then only the top ten query results may be shown in the output display area of the interface.

Once a selection of the top number N has been received, an instruction may be appended to the query so that only the top number N of results are included in an outputted result of the query. In some instances, this top number N may be a user selectable number between 1 and 100.

In some instances, a format menu may be displayed in the interface. The format menu may provide the user with an option to select one of a plurality of data formats for an output. In some instances, the output may be a graph, chart, or other visual representation of the query results shown in the output display area. In other instances, the output may be the query results or other data generated from an outputted result of the query.

Once the user selects one of the data formats and the selection of the one data format is received, the output, including, but not limited to, the graph, grid, chart, or other visual representation, may be generated in the selected data format. Examples of data formats include a .NET format and a HTML5 format. In some instances, the output, including, but not limited to, the graph, chart, or other visual representation, may exported in the selected data format for use by another program.

Figure 4:
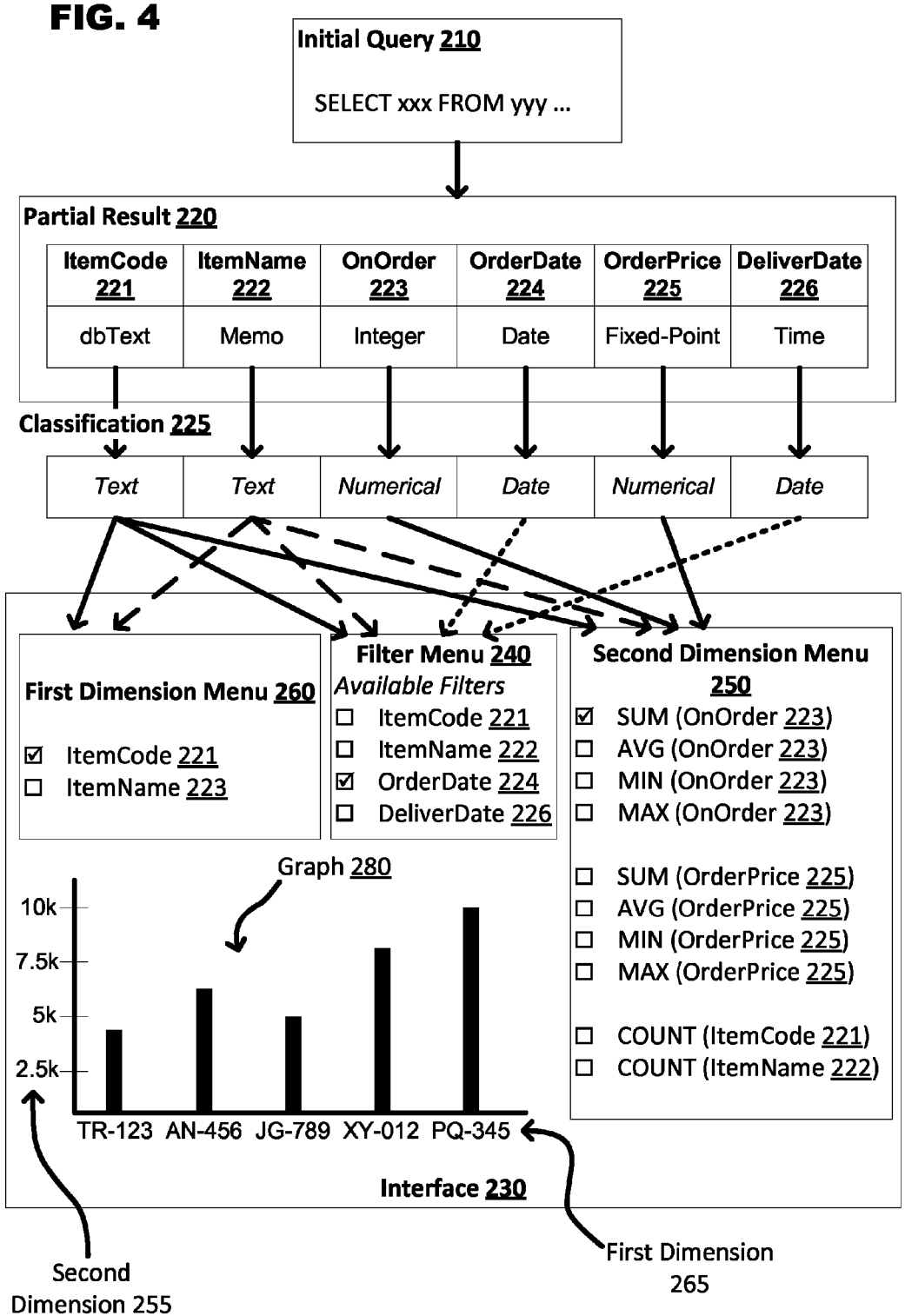
FIG. 4 shows an exemplary execution of the second process.

FIG. 4 shows an exemplary execution of the second process. In box 210, an initial query may be selected. In this case, the query to be selected is a query in a structured query language (SQL), though in different embodiments different queries types, languages, and structures may also be selected. Once the initial query has been identified, at least a partial execution of the identified query may be triggered to identify the fields and/or field types in the query result.

The fields and field types are shown in box 220. In this example, the fields ItemCode 221, ItemName 222, OnOrder 223, OrderDate 224, OrderPrice 225, and DeliverDate 226 are included in the partial result 220. Also, in this example, only the fields and field types are outputted as the partial result 220.

Once the partial results have been generated, each field 221 to 226 in the first row of the partial result may be classified 225 as one of text, numerical, and date according to its respective field type. Since only the OnOrder 223 and OrderPrice 225 fields contain data consisting of number types, in this case Integer type in OnOrder field 223 and fixed-point type in OrderPrice field 225, only these fields 223 and 225 may be classified as numerical. Since only the OrderDate 224 and DeliverDate 226 fields contain data in a recognized date format, in this case the date and/or time database field types, only these fields 224 and 226 may be classified as dates. Since the remaining fields ItemCode 221 and ItemName 222 do not satisfy the criteria for being classified as numerical or date, these fields 221 and 222 may be classified as text.

Once each of the fields 221 to 226 in the partial results have been classified, the generation of the user interface 230 may then start. The user interface 230 may include three menus containing one or more user selectable options. The three menus include a first dimension menu 260, a second dimension menu 250, and a filter menu 240. Once the user selects one or more options from the first dimension menu 260 and the second dimension menu 250, a chart, graph 280, or other visual representation of result of a full query execution subject to the options selected from each of the three menus 240, 250, and 260.

The options that are shown in each of three menus 240, 250, and 260 may vary depending on how each of the query result fields 221 to 226 have been classified. For those fields classified as text: (i) each respective field may be added to the filter menu 240 in the interface, (ii) each respective field may be designated as selectable in the first dimension menu 260 of the interface, and (iii) a selectable count function for each respective field may be added to the second dimension menu 250 of the interface. The count function may count a number of instances of a unique field value. Thus, as shown in FIG. 2, the text fields ItemCode 221 and Item 222 have been added to the first dimension menu 260 and filter menus 240 of the interface 230. Additionally, a COUNT function for counting a number of instances of a unique field value in each of the ItemCode 221 and ItemName 222 fields has also been added to the second dimension menu 250.

For those fields 223 and 225 classified as numerical, a selectable mathematical function operative on data in each respective field may be added to the second dimension menu 250 of the interface 230. In the example shown in FIG. 2, a sum, average, minimum, and maximum selectable functions have been added to the second dimension menu 250 for each of the OnOrder 223 and OrderPrice 225 fields that have been classified as numerical.

For those fields classified as date, each respective field may be added to the filter menu 240. In the example shown in FIG. 2, the OrderDate 224 and DeliverDate 226 fields, which are the only fields classified as date, have been added to the filter menu 240 shown in the interface.

Once the respective menus 240, 250, and 260 have been created, a user may select one or more options from each of the menus 240, 250, and 260. In the example shown in FIG. 2, the user has selected the ItemCode field 221 in the first dimension menu 260, the OrderDate field 224 in the filter menu 240, and the Sum function for the OnOrder field 223 in the second dimension menu 250 for adding all of the data in the OnOrder field 223. In addition to selecting the OrderDate field 224 in the filter menu, the user may also select a further criterion, value, or range of values (not shown) for further limiting the returned query results to the selected criterion, value, or range of values. Thus, in the example of FIG. 2, if the user selected to limit the OrderDate field 224 to only those results having a date in the OrderDate field 224 that is within the past year (not shown), the results of query shown in the chart, graph 280, or other visual representation of results may be limited to those results with an OrderDate field 224 date within the past year.

Once the user's selection is received, the identified query may be appended to apply the at least one selected function in the second dimension menu 250 (in this case the SUM function to add the data in the OnOrder field 223) according to the field(s) selected from the first dimension menu.

Once the full results of the query have been generated, the chart, grid, graph 280, or other visual representation of results may be displayed. In the example shown in FIG. 2, the visual representation is a graph 280 having a first dimension 265 corresponding to a horizontal axis and a second dimension 255 corresponding to a vertical axis. Since the ItemCode field 221 was selected from the first dimension menu, each of the item codes included in the ItemCode field 221 of the query results may be displayed along the horizontal axis. In this case, the item code includes the item codes TR-123, AN-456, JG-789, XY-012, and PQ-345. Thus, data from the field(s) selected from the first dimension menu 260 may be displayed in the first dimension 265 of the visual representation 280 included in the interface 230.

Since the SUM function for the OnOrder field 223 was selected in the second dimension menu, the results of adding all of the OnOrder 223 field data for each unique ItemCode 221 field having an OrderDate 223 date within the past year may be displayed along the vertical dimension 225 for each of the unique ItemCodes 221. Thus, a result of applying the selected function(s) from the second dimension menu 250 in the appended query to the field data displayed in the first dimension 265 may be displayed in the second dimension 255 of the visual representation 280 included in the interface 230.

Figure 5:
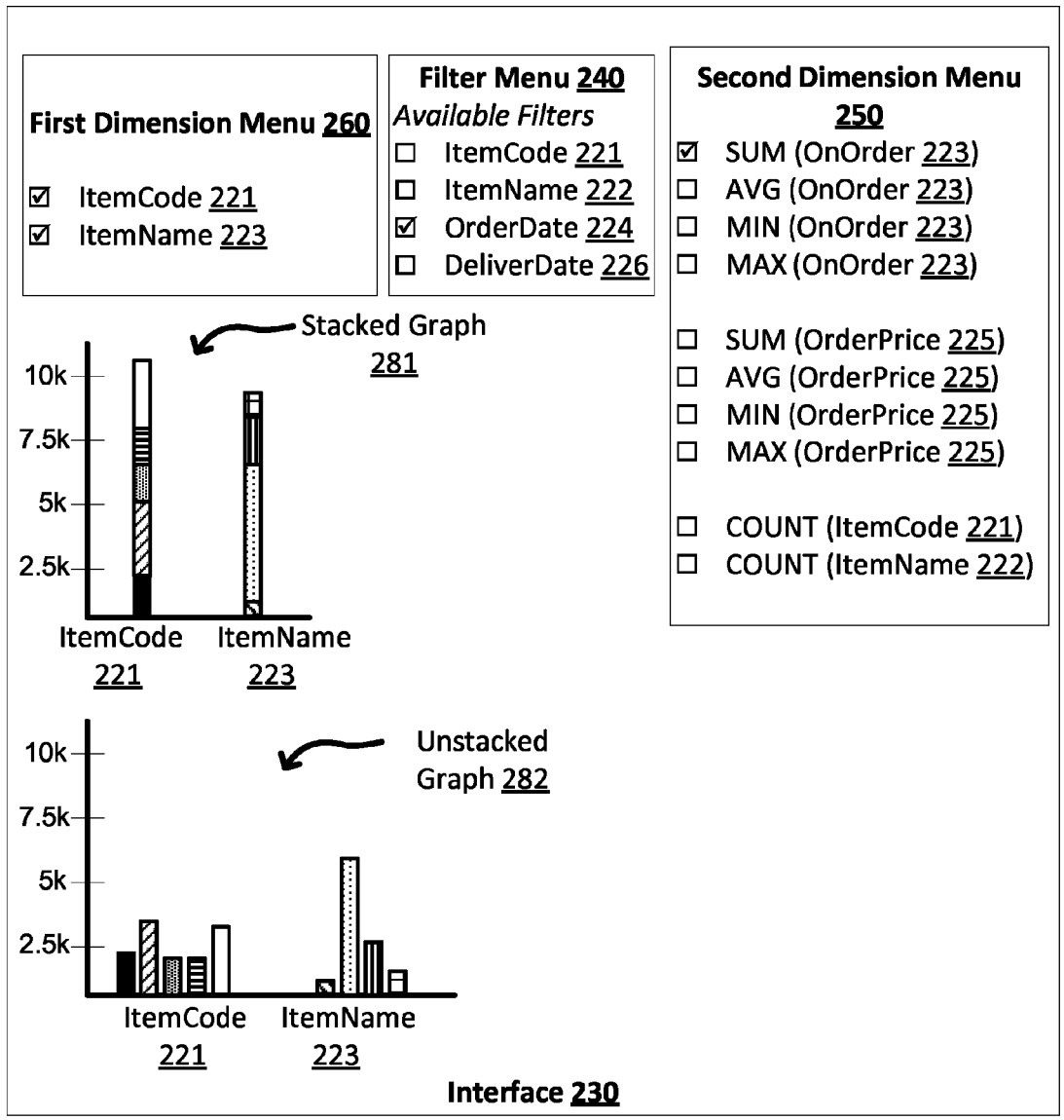
FIG. 5 shows an exemplary alternative interface.

FIG. 5 shows an alternative view of an exemplary interface 230 if a user selects more than one field in the first dimension menu 260. In this example, a user has selected both the ItemCode 221 and ItemName 223 fields in the first dimension menu 260. In this case, the interface may show the results of the selected functions from the second dimension menu 250 as applied to each of the selected fields in the first dimension menu 260. In this example, the results are shown in both a stacked chart graph 281 and unstacked chart graph 282. In some instances, the interface 230 may include an option to toggle between the stacked view 281 and the unstacked view 282. Although this example shows only two fields being selected in the first dimension menu, in other instances a different number of fields greater than or less than that shown may be selected.

FIG. 6 shows an exemplary architecture. Query interface system 310 may include a computer readable medium 515 storing application modules that may include a field classification module 320, interface generation module 330, and a query interactivity module 340. In some instances, these modules 320, 330, 340, and/or other modules or components of the query interface system 310 may be stored in a memory 503 or data structure 505 that is separate from the computer readable medium 515 and/or the query interface system 310.

The query interactivity module 340 may include functionality for identifying a query in the business management system, triggering at least a partial execution of the identified query to identify a field type of each field in a query result, and appending the identified query, all of which may occur through the communications device, which may include hardware enabling connectivity with the business management system.

The field classification module 330 may include functionality for classifying each field in the first row of the query result as one of text, numerical, and date based on its respective field type.

The interface generation module 320 may include functionality, for those fields classified as text, for adding each respective field to a filter menu in a user interface, designating each respective field as selectable in a first dimension menu of the user interface, and adding a selectable count function for each respective field to a second dimension menu of the user interface. The count function may count a number of instances of a unique field value.

The interface generation module 320 may also include functionality, for those fields classified as numerical, for adding a selectable mathematical function operative on data in each respective field to the second dimension menu of the interface. The interface generation module 320 may also include functionality, for those fields classified as date, for adding each respective field to the filter menu.

The interface generation module 320 may also include functionality for receiving a selection of at least one field in the first dimension menu and at least one function in the second dimension menu; displaying in a first dimension of the user interface data from the at least one selected field from the first dimension menu; and displaying in a second dimension of the user interface a result of applying a selected function in the appended query to data displayed in the first dimension. The modifying of the identified query may also include applying at least one selected function added in the second dimension menu according to the at least one selected field in the first dimension menu.

Query interface system 310 may be connected to a network 550. Network 550 may include a LAN, WAN, bus, or the Internet. Query interface system 310 may interface with other systems and components depending on the application. For example, a network/data storage device 560 may be used to store the different types of data structures, including business management system data and/or data object 371, as well as queries 372 to be executed on the business management system data and/or data objects 371. The storage device 560 may be a part of a business management system 370.

In some embodiments the network storage device 560 may also be separate from the business management system 370 but connected to it through network 550. The storage device 560 may contain a hard disk drive, flash memory, or other computer readable media capable of storing data. Other external systems and data sources may also be connected to network 550. These other systems may be used to supply additional data or information used by the query interface system 310 or business management system 370, such as, for example, financial, customer, or other organizational data.

Each of the systems, clients, and devices in FIG. 6 may contain a processing device 502, memory 503 storing loaded data or a loaded data structure 505, and a communications device 504, all of which may be interconnected via a system bus. In various embodiments, each of the systems 310 and 370 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems 310 and 370 and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data and may include the computer readable medium 515. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the query interface system 310 is shown as a separate system from the business management system 370, in some instances the business management system 370 and the query interface system 310 may be functionally integrated into a single system.

We claim:

1. A method for providing additional time periods in a query interface comprising:
    identifying a query;
    triggering a partial execution of the identified query to identify fields in a query result having a date field type;
    classifying, using a processing device, the identified fields having a date field type as date fields;
    appending, using the processing device, the identified query to compute a year, quarter, month, and week of a date in each classified date field and create new respective time period fields in the query result storing the computed year, month, quarter, and week for each classified date field;
    triggering an execution of the appended query;
    generating, from the appended query execution, the query result including the computed year, quarter, month, and week field data and fields for with each classified date field;
    adding each of the classified date fields and the computed year, quarter, month, and week fields to a filter menu in the query interface;
    designating each of the computed year, quarter, month, and week fields as selectable in a first dimension menu of the query interface;
    adding a selectable count function for each of the computed year, quarter, month, and week fields to a second dimension menu of the query interface, wherein the count function counts a number of instances of a unique field value;
    receiving a selection of at least one field in the first dimension menu and at least one function in the second dimension menu;
    appending, using the processing device, the identified query to apply the at least one selected function added in the second dimension menu according to the at least one selected field in the first dimension menu;
    displaying the query interface;
    displaying in a first dimension of the interface data from the at least one selected field from the first dimension menu;
    displaying in a second dimension of the interface a result of applying the selected function in the appended query to data displayed in the first dimension;
    identifying a range of values associated with each of the fields added to the filter menu;
    providing an option in the filter menu to select at least one value in the range of values associated with at least one field added to the filter menu; and
    filtering the query result based on a selection of the at least one value in the range of values associated with at least one field added to the filter menu.

2. The method of claim 1, wherein each of the created year, quarter, month, and week fields are associated in the query result with their respective classified data field.

3. The method of claim 1, further comprising
    receiving a selection of at least one field in the filter menu and a subset of data in the at least one field in the filter menu; and
    appending the identified query to apply the at least one selected function added in the second dimension menu to the received subset of data in the received at least one field in the filter menu.

4. The method of claim 1, further comprising adding a user selectable date range in the filter menu for each of the added year, quarter, month, and week fields, wherein the user selectable date range is bound by an earliest time period included in the query result for each respective field and a latest time period included in the query result for each respective field.

5. The method of claim 1, further comprising receiving a user selection from the filter menu that includes a date range for each of the year, quarter, month, and week fields, wherein the query result is filtered to include only results having each of the year, quarter, month, and week field data within each respective user selected date range.

6. The method of claim 1, wherein the first dimension is parallel to a horizontal axis of a graph and the second dimension is parallel to a vertical axis of the graph.

7. The method of claim 1, wherein the first dimension is parallel to a vertical axis of a graph and the second dimension is parallel to a horizontal axis of the graph.

8. The method of claim 1, further comprising generating a graph, grid, chart, or other visual representation from the query result.

9. The method of claim 1, further comprising:
displaying a format menu in the query interface that includes an option to select at least one of a plurality of formats for the query result;
receiving a selection of the at least one format; and
reformatting the query result into a visual representation in the at least one selected format.

10. The method of claim 9, wherein the visual representation is a grid, chart, or graph and the plurality of formats include a .NET format and a HTML5 format.

11. The method of claim 10, wherein the visual representation is switchable between a grid format and a chart format.

12. The method of claim 9, further comprising exporting the visual representation in the selected format.

13. A method for providing additional time periods in a query interface comprising:
identifying a query;
triggering a partial execution of the identified query to identify fields in a query result having a date field type;
classifying, using a processing device, the identified fields having a date field type as date fields;
appending, using the processing device, the identified query to compute a year, quarter, month, and week of a date in each classified date field and create new respective time period fields in the query result storing the computed year, month, quarter, and week for each classified date field;
triggering an execution of the appended query;
generating, from the appended query execution, the query result including the computed year, quarter, month, and week field data and fields for with each classified date field;
adding each of the classified date fields and the computed year, quarter, month, and week fields to a filter menu in the query interface;
designating each of the computed year, quarter, month, and week fields as selectable in a first dimension menu of the query interface;
adding a selectable count function for each of the computed year, quarter, month, and week fields to a second dimension menu of the query interface, wherein the count function counts a number of instances of a unique field value;
receiving a selection of at least one field in the first dimension menu and at least one function in the second dimension menu;
appending, using the processing device, the identified query to apply the at least one selected function added in the second dimension menu according to the at least one selected field in the first dimension menu;
displaying the query interface;
displaying in a first dimension of the interface data from the at least one selected field from the first dimension menu;
displaying in a second dimension of the interface a result of applying the selected function in the appended query to data displayed in the first dimension;
displaying a sorting menu in the interface that includes an ascending sorting option, a descending sorting option, and an option to select at least one of the fields added to the query interface that is to be sorted according to either the ascending sorting option or the descending sorting option;
receiving a selection of the at least one added fields to the query interface that is to be sorted and a selection of either the ascending sorting option or the descending sorting option; and
sorting the query result according to the received selection before outputting the query result.

14. A method for providing additional time periods in a query interface comprising:
identifying a query;
triggering a partial execution of the identified query to identify fields in a query result having a date field type;
classifying, using a processing device, the identified fields having a date field type as date fields;
appending, using the processing device, the identified query to compute a year, quarter, month, and week of a date in each classified date field and create new respective time period fields in the query result storing the computed year, month, quarter, and week for each classified date field;
triggering an execution of the appended query;
generating, from the appended query execution, the query result including the computed year, quarter, month, and week field data and fields for with each classified date field;
adding each of the classified date fields and the computed year, quarter, month, and week fields to a filter menu in the query interface;
designating each of the computed year, quarter, month, and week fields as selectable in a first dimension menu of the query interface;
adding a selectable count function for each of the computed year, quarter, month, and week fields to a second dimension menu of the query interface, wherein the count function counts a number of instances of a unique field value;
receiving a selection of at least one field in the first dimension menu and at least one function in the second dimension menu;
appending, using the processing device, the identified query to apply the at least one selected function added in the second dimension menu according to the at least one selected field in the first dimension menu;
displaying the query interface;
displaying in a first dimension of the interface data from the at least one selected field from the first dimension menu;
displaying in a second dimension of the interface a result of applying the selected function in the appended query to data displayed in the first dimension;
displaying a grouping menu in the interface that includes an option to select at least one of the added fields to the query interface for grouping the query result;
receiving a selection of the at least one field added fields to the query interface for grouping; and
grouping the filtered modified query result according to the received selection before outputting the query result.

15. A method for providing additional time periods in a query interface comprising:
- identifying a query;
- triggering a partial execution of the identified query to identify fields in a query result having a date field type;
- classifying, using a processing device, the identified fields having a date field type as date fields;
- appending, using the processing device, the identified query to compute a year, quarter, month, and week of a date in each classified date field and create new respective time period fields in the query result storing the computed year, month, quarter, and week for each classified date field;
- triggering an execution of the appended query;
- generating, from the appended query execution, the query result including the computed year, quarter, month, and week field data and fields for with each classified date field;
- adding each of the classified date fields and the computed year, quarter, month, and week fields to a filter menu in the query interface;
- designating each of the computed year, quarter, month, and week fields as selectable in a first dimension menu of the query interface;
- adding a selectable count function for each of the computed year, quarter, month, and week fields to a second dimension menu of the query interface, wherein the count function counts a number of instances of a unique field value;
- receiving a selection of at least one field in the first dimension menu and at least one function in the second dimension menu;
- appending, using the processing device, the identified query to apply the at least one selected function added in the second dimension menu according to the at least one selected field in the first dimension menu;
- displaying the query interface;
- displaying in a first dimension of the interface data from the at least one selected field from the first dimension menu;
- displaying in a second dimension of the interface a result of applying the selected function in the appended query to data displayed in the first dimension;
- displaying a limiting menu in the interface that includes an option to limit the query result to a top number N of results, wherein the top number N is selectable by a user;
- receiving a selection of the top number N; and
- outputting only the top number N of results of the filtered modified query results.

16. A method for providing additional time periods in a query interface comprising:
- identifying a query;
- triggering a partial execution of the identified query to identify fields in a query result having a date field type;
- classifying, using a processing device, the identified fields having a date field type as date fields;
- appending, using the processing device, the identified query to compute a year, quarter, month, and week of a date in each classified date field and create new respective time period fields in the query result storing the computed year, month, quarter, and week for each classified date field;
- triggering an execution of the appended query;
- generating, from the appended query execution, the query result including the computed year, quarter, month, and week field data and fields for with each classified date field;
- adding each of the classified date fields and the computed year, quarter, month, and week fields to a filter menu in the query interface;
- designating each of the computed year, quarter, month, and week fields as selectable in a first dimension menu of the query interface;
- adding a selectable count function for each of the computed year, quarter, month, and week fields to a second dimension menu of the query interface, wherein the count function counts a number of instances of a unique field value;
- receiving a selection of at least one field in the first dimension menu and at least one function in the second dimension menu;
- appending, using the processing device, the identified query to apply the at least one selected function added in the second dimension menu according to the at least one selected field in the first dimension menu;
- displaying the query interface;
- displaying in a first dimension of the interface data from the at least one selected field from the first dimension menu;
- displaying in a second dimension of the interface a result of applying the selected function in the appended query to data displayed in the first dimension;
- receiving a selection of more than one field in the first dimension menu;
- displaying an option to select between a stacked chart format and an unstacked chart format;
- receiving a selection of the displayed option; and
- displaying in the first dimension of the interface data from each selected field from the first dimension menu in the selected chart format.

17. A non-transitory computer readable medium comprising a set of stored instructions that, when executed by a processing device, cause the processing device to:
- identify a query;
- trigger a partial execution of the identified query to identify fields in a query result having a date field type;
- classify the identified fields having a date field type as date fields;
- append the identified query to compute a year, quarter, month, and week of a date in each classified date field and create new respective time period fields in the query result storing the computed year, month, quarter, and week for each classified date field;
- trigger an execution of the appended query;
- generate, from the appended query execution, the query result including the computed year, quarter, month, and week field data and fields for with each classified date field;
- add each of the classified date fields and the computed year, quarter, month, and week fields to a filter menu in a query interface;
- designate each of the computed year, quarter, month, and week fields as selectable in a first dimension menu of the query interface;
- add a selectable count function for each of the computed year, quarter, month, and week fields to a second dimension menu of the query interface, wherein the count function counts a number of instances of a unique field value;
- receive a selection of at least one field in the first dimension menu and at least one function in the second dimension menu;

append the identified query to apply the at least one selected function added in the second dimension menu according to the at least one selected field in the first dimension menu;
display the query interface;
display in a first dimension of the interface data from the at least one selected field from the first dimension menu;
display in a second dimension of the interface a result of applying the selected function in the appended query to data displayed in the first dimension;
identify a range of values associated with each of the fields added to the filter menu;
provide an option in the filter menu to select at least one value in the range of values associated with at least one field added to the filter menu; and
filter the query result based on a selection of the at least one value in the range of values associated with at least one field added to the filter menu.

18. A method for providing an additional time period in a query interface comprising:
identifying a query;
triggering a partial execution of the identified query to identify fields in a query result having a date field type;
classifying, using a processing device, an identified field having a date field type as a date field;
appending, using the processing device, the identified query to compute a time period for the classified date field and create a time period field in the query result for storing the computed time period, the computed time period encompassing a broader time period than the classified date field;
triggering an execution of the appended query;
generating, from the appended query execution, the query result including the computed time period data and field;
adding the classified date field and computed time period field to a filter menu in the query interface;
designating the computed time period field as selectable in a first dimension menu of the query interface;
adding a selectable count function for the computed time period field to a second dimension menu of the query interface, wherein the count function counts a number of instances of a unique field value;
receiving a selection of at least one field in the first dimension menu and at least one function in the second dimension menu;
appending, using the processing device, the identified query to apply the at least one selected function added in the second dimension menu according to the at least one selected field in the first dimension menu;
displaying the query interface;
displaying in a first dimension of the interface data from the at least one selected field from the first dimension menu;
displaying in a second dimension of the interface a result of applying the selected function in the appended query to data displayed in the first dimension;
identifying a range of values associated with each of the fields added to the filter menu;
providing an option in the filter menu to select at least one value in the range of values associated with at least one field added to the filter menu; and
filtering the query result based on a selection of the at least one value in the range of values associated with at least one field added to the filter menu.

19. A non-transitory computer readable medium comprising a set of stored instructions that, when executed by a processing device, cause the processing device to:
identify a query;
trigger a partial execution of the identified query to identify fields in a query result having a date field type;
classify the identified fields having a date field type as date fields;
append the identified query to compute a year, quarter, month, and week of a date in each classified date field and create new respective time period fields in the query result storing the computed year, month, quarter, and week for each classified date field;
trigger an execution of the appended query;
generate, from the appended query execution, the query result including the computed year, quarter, month, and week field data and fields for with each classified date field;
add each of the classified date fields and the computed year, quarter, month, and week fields to a filter menu in a query interface;
designate each of the computed year, quarter, month, and week fields as selectable in a first dimension menu of the query interface;
add a selectable count function for each of the computed year, quarter, month, and week fields to a second dimension menu of the query interface, wherein the count function counts a number of instances of a unique field value;
receive a selection of at least one field in the first dimension menu and at least one function in the second dimension menu;
append the identified query to apply the at least one selected function added in the second dimension menu according to the at least one selected field in the first dimension menu;
display the query interface;
display in a first dimension of the interface data from the at least one selected field from the first dimension menu;
display in a second dimension of the interface a result of applying the selected function in the appended query to data displayed in the first dimension;
display a sorting menu in the interface that includes an ascending sorting option, a descending sorting option, and an option to select at least one of the fields added to the query interface that is to be sorted according to either the ascending sorting option or the descending sorting option;
receive a selection of the at least one added fields to the query interface that is to be sorted and a selection of either the ascending sorting option or the descending sorting option; and
sort the query result according to the received selection before outputting the query result.

20. A non-transitory computer readable medium comprising a set of stored instructions that, when executed by a processing device, cause the processing device to:
identify a query;
trigger a partial execution of the identified query to identify fields in a query result having a date field type;
classify the identified fields having a date field type as date fields;
append the identified query to compute a year, quarter, month, and week of a date in each classified date field and create new respective time period fields in the query result storing the computed year, month, quarter, and week for each classified date field;

trigger an execution of the appended query;
generate, from the appended query execution, the query result including the computed year, quarter, month, and week field data and fields for with each classified date field;
add each of the classified date fields and the computed year, quarter, month, and week fields to a filter menu in a query interface;
designate each of the computed year, quarter, month, and week fields as selectable in a first dimension menu of the query interface;
add a selectable count function for each of the computed year, quarter, month, and week fields to a second dimension menu of the query interface, wherein the count function counts a number of instances of a unique field value;
receive a selection of at least one field in the first dimension menu and at least one function in the second dimension menu;
append the identified query to apply the at least one selected function added in the second dimension menu according to the at least one selected field in the first dimension menu;
display the query interface;
display in a first dimension of the interface data from the at least one selected field from the first dimension menu;
display in a second dimension of the interface a result of applying the selected function in the appended query to data displayed in the first dimension;
display a grouping menu in the interface that includes an option to select at least one of the added fields to the query interface for grouping the query result;
receive a selection of the at least one field added fields to the query interface for grouping; and
group the filtered modified query result according to the received selection before outputting the query result.

21. A non-transitory computer readable medium comprising a set of stored instructions that, when executed by a processing device, cause the processing device to:
identify a query;
trigger a partial execution of the identified query to identify fields in a query result having a date field type;
classify the identified fields having a date field type as date fields;
append the identified query to compute a year, quarter, month, and week of a date in each classified date field and create new respective time period fields in the query result storing the computed year, month, quarter, and week for each classified date field;
trigger an execution of the appended query;
generate, from the appended query execution, the query result including the computed year, quarter, month, and week field data and fields for with each classified date field;
add each of the classified date fields and the computed year, quarter, month, and week fields to a filter menu in a query interface;
designate each of the computed year, quarter, month, and week fields as selectable in a first dimension menu of the query interface;
add a selectable count function for each of the computed year, quarter, month, and week fields to a second dimension menu of the query interface, wherein the count function counts a number of instances of a unique field value;
receive a selection of at least one field in the first dimension menu and at least one function in the second dimension menu;
append the identified query to apply the at least one selected function added in the second dimension menu according to the at least one selected field in the first dimension menu;
display the query interface;
display in a first dimension of the interface data from the at least one selected field from the first dimension menu;
display in a second dimension of the interface a result of applying the selected function in the appended query to data displayed in the first dimension;
display a limiting menu in the interface that includes an option to limit the query result to a top number N of results, wherein the top number N is selectable by a user;
receive a selection of the top number N; and
output only the top number N of results of the filtered modified query results.

22. A non-transitory computer readable medium comprising a set of stored instructions that, when executed by a processing device, cause the processing device to:
identify a query;
trigger a partial execution of the identified query to identify fields in a query result having a date field type;
classify the identified fields having a date field type as date fields;
append the identified query to compute a year, quarter, month, and week of a date in each classified date field and create new respective time period fields in the query result storing the computed year, month, quarter, and week for each classified date field;
trigger an execution of the appended query;
generate, from the appended query execution, the query result including the computed year, quarter, month, and week field data and fields for with each classified date field;
add each of the classified date fields and the computed year, quarter, month, and week fields to a filter menu in a query interface;
designate each of the computed year, quarter, month, and week fields as selectable in a first dimension menu of the query interface;
add a selectable count function for each of the computed year, quarter, month, and week fields to a second dimension menu of the query interface, wherein the count function counts a number of instances of a unique field value;
receive a selection of at least one field in the first dimension menu and at least one function in the second dimension menu;
append the identified query to apply the at least one selected function added in the second dimension menu according to the at least one selected field in the first dimension menu;
display the query interface;
display in a first dimension of the interface data from the at least one selected field from the first dimension menu;
display in a second dimension of the interface a result of applying the selected function in the appended query to data displayed in the first dimension;
receive a selection of more than one field in the first dimension menu;

display an option to select between a stacked chart format and an unstacked chart format;
receive a selection of the displayed option; and
display in the first dimension of the interface data from each selected field from the first dimension menu in the selected chart format.

23. A method for providing an additional time period in a query interface comprising:
identifying a query;
triggering a partial execution of the identified query to identify fields in a query result having a date field type;
classifying, using a processing device, an identified field having a date field type as a date field;
appending, using the processing device, the identified query to compute a time period for the classified date field and create a time period field in the query result for storing the computed time period, the computed time period encompassing a broader time period than the classified date field;
triggering an execution of the appended query;
generating, from the appended query execution, the query result including the computed time period data and field;
adding the classified date field and computed time period field to a filter menu in the query interface;
designating the computed time period field as selectable in a first dimension menu of the query interface;
adding a selectable count function for the computed time period field to a second dimension menu of the query interface, wherein the count function counts a number of instances of a unique field value;
receiving a selection of at least one field in the first dimension menu and at least one function in the second dimension menu;
appending, using the processing device, the identified query to apply the at least one selected function added in the second dimension menu according to the at least one selected field in the first dimension menu;
displaying the query interface;
displaying in a first dimension of the interface data from the at least one selected field from the first dimension menu;
displaying in a second dimension of the interface a result of applying the selected function in the appended query to data displayed in the first dimension;
displaying a sorting menu in the interface that includes an ascending sorting option, a descending sorting option, and an option to select at least one of the fields added to the query interface that is to be sorted according to either the ascending sorting option or the descending sorting option;
receiving a selection of the at least one added fields to the query interface that is to be sorted and a selection of either the ascending sorting option or the descending sorting option; and
sorting the query result according to the received selection before outputting the query result.

24. A method for providing an additional time period in a query interface comprising:
identifying a query;
triggering a partial execution of the identified query to identify fields in a query result having a date field type;
classifying, using a processing device, an identified field having a date field type as a date field;
appending, using the processing device, the identified query to compute a time period for the classified date field and create a time period field in the query result for storing the computed time period, the computed time period encompassing a broader time period than the classified date field;
triggering an execution of the appended query;
generating, from the appended query execution, the query result including the computed time period data and field;
adding the classified date field and computed time period field to a filter menu in the query interface;
designating the computed time period field as selectable in a first dimension menu of the query interface;
adding a selectable count function for the computed time period field to a second dimension menu of the query interface, wherein the count function counts a number of instances of a unique field value;
receiving a selection of at least one field in the first dimension menu and at least one function in the second dimension menu;
appending, using the processing device, the identified query to apply the at least one selected function added in the second dimension menu according to the at least one selected field in the first dimension menu;
displaying the query interface;
displaying in a first dimension of the interface data from the at least one selected field from the first dimension menu;
displaying in a second dimension of the interface a result of applying the selected function in the appended query to data displayed in the first dimension;
displaying a grouping menu in the interface that includes an option to select at least one of the added fields to the query interface for grouping the query result;
receiving a selection of the at least one field added fields to the query interface for grouping; and
grouping the filtered modified query result according to the received selection before outputting the query result.

25. A method for providing an additional time period in a query interface comprising:
identifying a query;
triggering a partial execution of the identified query to identify fields in a query result having a date field type;
classifying, using a processing device, an identified field having a date field type as a date field;
appending, using the processing device, the identified query to compute a time period for the classified date field and create a time period field in the query result for storing the computed time period, the computed time period encompassing a broader time period than the classified date field;
triggering an execution of the appended query;
generating, from the appended query execution, the query result including the computed time period data and field;
adding the classified date field and computed time period field to a filter menu in the query interface;
designating the computed time period field as selectable in a first dimension menu of the query interface;
adding a selectable count function for the computed time period field to a second dimension menu of the query interface, wherein the count function counts a number of instances of a unique field value;
receiving a selection of at least one field in the first dimension menu and at least one function in the second dimension menu;
appending, using the processing device, the identified query to apply the at least one selected function added in the second dimension menu according to the at least one selected field in the first dimension menu;
displaying the query interface;

displaying in a first dimension of the interface data from the at least one selected field from the first dimension menu;

displaying in a second dimension of the interface a result of applying the selected function in the appended query to data displayed in the first dimension;

displaying a limiting menu in the interface that includes an option to limit the query result to a top number N of results, wherein the top number N is selectable by a user;

receiving a selection of the top number N; and outputting only the top number N of results of the filtered modified query results.

26. A method for providing an additional time period in a query interface comprising:

identifying a query;

triggering a partial execution of the identified query to identify fields in a query result having a date field type;

classifying, using a processing device, an identified field having a date field type as a date field;

appending, using the processing device, the identified query to compute a time period for the classified date field and create a time period field in the query result for storing the computed time period, the computed time period encompassing a broader time period than the classified date field;

triggering an execution of the appended query;

generating, from the appended query execution, the query result including the computed time period data and field;

adding the classified date field and computed time period field to a filter menu in the query interface;

designating the computed time period field as selectable in a first dimension menu of the query interface;

adding a selectable count function for the computed time period field to a second dimension menu of the query interface, wherein the count function counts a number of instances of a unique field value;

receiving a selection of at least one field in the first dimension menu and at least one function in the second dimension menu;

appending, using the processing device, the identified query to apply the at least one selected function added in the second dimension menu according to the at least one selected field in the first dimension menu;

displaying the query interface;

displaying in a first dimension of the interface data from the at least one selected field from the first dimension menu;

displaying in a second dimension of the interface a result of applying the selected function in the appended query to data displayed in the first dimension;

receiving a selection of more than one field in the first dimension menu;

displaying an option to select between a stacked chart format and an unstacked chart format;

receiving a selection of the displayed option; and displaying in the first dimension of the interface data from each selected field from the first dimension menu in the selected chart format.

\* \* \* \* \*